United States Patent
Bruders et al.

(10) Patent No.: US 8,122,729 B2
(45) Date of Patent: Feb. 28, 2012

(54) DEHUMIDIFICATION SYSTEMS AND METHODS FOR EXTRACTING MOISTURE FROM WATER DAMAGED STRUCTURES

(75) Inventors: William E. Bruders, Sedro Woolley, WA (US); Brandon Burton, Sedro Woolley, WA (US); Tom Schnelle, Anacortes, WA (US)

(73) Assignee: Dri-Eaz Products, Inc., Burlington, WA (US)

( * ) Notice: Subject to any disclaimer, the term of this patent is extended or adjusted under 35 U.S.C. 154(b) by 960 days.

(21) Appl. No.: 12/075,701

(22) Filed: Mar. 12, 2008

(65) Prior Publication Data
US 2008/0223050 A1    Sep. 18, 2008

Related U.S. Application Data

(60) Provisional application No. 60/918,003, filed on Mar. 13, 2007.

(51) Int. Cl.
F25D 17/06    (2006.01)
(52) U.S. Cl. .......................................... 62/93
(58) Field of Classification Search ............ 62/93, 272, 62/277
See application file for complete search history.

(56) References Cited

U.S. PATENT DOCUMENTS

| | | |
|---|---|---|
| 1,690,108 A | 11/1928 | Grady |
| 1,870,457 A | 8/1932 | Kenney |
| 1,894,026 A | 1/1933 | Derry |
| 2,093,725 A | 9/1937 | Hull |
| 2,130,092 A | 9/1938 | Kettering |
| 2,188,975 A | 2/1940 | Herz |
| 2,623,364 A | 12/1952 | Munters |
| D171,429 S | 2/1954 | Thompson |
| 2,719,596 A | 10/1955 | Kent et al. |
| 2,758,390 A | 8/1956 | Munters |
| 2,886,956 A | 5/1959 | Loveley |
| 2,905,851 A | 9/1959 | Caussin |
| 2,932,178 A | 4/1960 | Armstrong et al. |
| 2,959,036 A | 11/1960 | Mehalick |
| 2,975,609 A | 3/1961 | Allander et al. |
| 3,000,193 A | 9/1961 | Crider |
| 3,035,419 A | 5/1962 | Wigert |
| 3,097,507 A | 7/1963 | Makuh |
| 3,141,762 A | 7/1964 | Serck-Hanssen |
| 3,149,479 A | 9/1964 | Peterson |
| D212,777 S | 11/1968 | Anderson |
| 3,621,906 A | 11/1971 | Leffert |

(Continued)

FOREIGN PATENT DOCUMENTS

CN    1046384 A    10/1990

(Continued)

OTHER PUBLICATIONS

U.S. Appl. No. 12/272,455, filed Nov. 17, 2008, Burton et al.

(Continued)

*Primary Examiner* — Melvin Jones
(74) *Attorney, Agent, or Firm* — Perkins Coie LLP

(57) ABSTRACT

A dehumidification system for removing moisture from the air within a structure comprises a refrigerant system and a heat transfer system. The refrigerant system comprises a condenser section and an evaporator section. The heat transfer system comprises a first coil and a second coil. A primary air path extends through the first coil, the evaporator section, and the second coil. A secondary air path extends through the condenser section.

17 Claims, 3 Drawing Sheets

U.S. PATENT DOCUMENTS

| | | | |
|---|---|---|---|
| 3,623,549 | A | 11/1971 | Smith, Jr. |
| 3,807,493 | A | 4/1974 | Stewart |
| 3,820,581 | A | 6/1974 | Machida et al. |
| 3,877,518 | A | 4/1975 | Dreksler |
| 3,968,833 | A | 7/1976 | Strindehag et al. |
| 4,000,779 | A | 1/1977 | Irwin |
| 4,044,820 | A | 8/1977 | Nobles |
| 4,091,547 | A | 5/1978 | Leigh |
| 4,176,525 | A | 12/1979 | Tucker et al. |
| 4,183,399 | A | 1/1980 | Seehausen |
| 4,189,848 | A | 2/1980 | Ko et al. |
| D254,566 | S | 3/1980 | Cummins |
| 4,259,268 | A | 3/1981 | DiRoss |
| 4,280,483 | A | 7/1981 | Schaffer |
| 4,295,342 | A | 10/1981 | Parro |
| 4,333,517 | A | 6/1982 | Parro |
| 4,428,207 | A | 1/1984 | Hall |
| 4,452,051 | A | 6/1984 | Berger et al. |
| 4,502,286 | A | 3/1985 | Okada et al. |
| 4,546,820 | A | 10/1985 | Whipple |
| 4,607,498 | A | 8/1986 | Dinh |
| 4,615,383 | A | 10/1986 | Hisao |
| 4,628,696 | A | 12/1986 | Rodgers |
| 4,724,901 | A | 2/1988 | Munekawa |
| 4,771,824 | A | 9/1988 | Rojey et al. |
| 4,827,733 | A | 5/1989 | Dinh |
| 4,921,041 | A | 5/1990 | Akachi |
| D308,414 | S | 6/1990 | Makihara |
| 4,938,035 | A | 7/1990 | Dinh |
| 4,942,740 | A | 7/1990 | Shaw et al. |
| D310,412 | S | 9/1990 | Fukumoto et al. |
| 4,971,139 | A | 11/1990 | Khattar |
| 5,031,411 | A | 7/1991 | Gehring et al. |
| 5,033,539 | A | 7/1991 | Kohtaka |
| D325,252 | S | 4/1992 | Morris et al. |
| 5,115,645 | A | 5/1992 | Abraham |
| 5,117,651 | A | 6/1992 | Suh |
| 5,219,020 | A | 6/1993 | Akachi |
| D337,592 | S | 7/1993 | Hider et al. |
| 5,265,895 | A | 11/1993 | Barrett |
| 5,269,151 | A | 12/1993 | Dinh |
| D343,706 | S | 1/1994 | Gurstein |
| 5,333,470 | A | 8/1994 | Dinh |
| 5,394,040 | A | 2/1995 | Khanh |
| 5,404,938 | A | 4/1995 | Dinh |
| D361,178 | S | 8/1995 | Piret |
| 5,443,624 | A | 8/1995 | Claesson |
| 5,448,897 | A | 9/1995 | Dinh |
| D364,947 | S | 12/1995 | Kent et al. |
| D368,770 | S | 4/1996 | Tanner et al. |
| 5,548,905 | A | 8/1996 | Kuma et al. |
| 5,564,184 | A | 10/1996 | Dinh |
| 5,582,246 | A | 12/1996 | Dinh |
| D379,016 | S | 4/1997 | Wilson |
| 5,634,353 | A | 6/1997 | Hallin et al. |
| 5,649,372 | A | 7/1997 | Souza |
| 5,684,672 | A | 11/1997 | Karidis et al. |
| 5,736,647 | A | 4/1998 | Matsubara et al. |
| D394,499 | S | 5/1998 | Bettag et al. |
| 5,746,061 | A | 5/1998 | Kramer |
| 5,749,415 | A | 5/1998 | Dinh |
| D395,492 | S | 6/1998 | Phillips et al. |
| 5,794,453 | A | 8/1998 | Barnwell |
| D402,021 | S | 12/1998 | Allen et al. |
| 5,845,702 | A | 12/1998 | Dinh |
| 5,890,368 | A | 4/1999 | Lakdawala |
| 5,901,565 | A | 5/1999 | Morton, Jr. |
| 5,921,315 | A | 7/1999 | Dinh |
| 5,953,831 | A | 9/1999 | Yu |
| 5,953,926 | A | 9/1999 | Dressler et al. |
| 5,992,161 | A | 11/1999 | O'Halloran et al. |
| D419,230 | S | 1/2000 | Ciccone |
| D420,473 | S | 2/2000 | Shero |
| 6,021,644 | A | 2/2000 | Ares et al. |
| 6,030,426 | A | 2/2000 | Stopyra et al. |
| 6,035,551 | A | 3/2000 | Scheufler et al. |
| D422,351 | S | 4/2000 | Griffin |
| D422,386 | S | 4/2000 | Jaros et al. |
| D426,473 | S | 6/2000 | Blackburn |
| 6,101,815 | A | 8/2000 | van Oort et al. |
| 6,105,278 | A | 8/2000 | Gerrish et al. |
| D441,161 | S | 4/2001 | Shetterly |
| 6,223,543 | B1 | 5/2001 | Sandelman |
| 6,237,352 | B1 | 5/2001 | Goodchild |
| D445,116 | S | 7/2001 | Evans et al. |
| D453,560 | S | 2/2002 | Van Brunt |
| 6,447,586 | B1 | 9/2002 | Campbell |
| D465,018 | S | 10/2002 | Gustafsson et al. |
| 6,463,794 | B1 | 10/2002 | Moshe et al. |
| D480,467 | S | 10/2003 | White |
| 6,644,060 | B1 | 11/2003 | Dagan |
| 6,796,896 | B2 | 9/2004 | Laiti |
| D500,848 | S | 1/2005 | Holderfield et al. |
| 6,895,774 | B1 | 5/2005 | Ares et al. |
| D508,735 | S | 8/2005 | Klein |
| 6,941,763 | B2 * | 9/2005 | Maeda et al. ............ 62/93 |
| D515,190 | S | 2/2006 | Bartholmey et al. |
| 7,194,870 | B1 | 3/2007 | O'Brien et al. |
| 7,246,503 | B1 | 7/2007 | O'Brien et al. |
| 7,281,389 | B1 | 10/2007 | O'Brien et al. |
| D565,269 | S | 3/2008 | Tomasiak et al. |
| D572,356 | S | 7/2008 | Harber |
| D612,032 | S | 3/2010 | Gildersleeve et al. |
| D634,414 | S | 3/2011 | Wolfe et al. |
| 2003/0034573 | A1 | 2/2003 | Mulvaney |
| 2005/0011255 | A1 | 1/2005 | Weisenberger et al. |
| 2005/0011962 | A1 | 1/2005 | Weisenberger et al. |
| 2005/0066538 | A1 | 3/2005 | Goldberg et al. |
| 2005/0183430 | A1 | 8/2005 | McMillan et al. |
| 2006/0214315 | A1 | 9/2006 | Williams |
| 2007/0012060 | A1 | 1/2007 | Simons |
| 2007/0107450 | A1 | 5/2007 | Sasao et al. |
| 2008/0028776 | A1 | 2/2008 | O'Brien et al. |
| 2009/0101727 | A1 | 4/2009 | Boudreau |
| 2010/0269526 | A1 | 10/2010 | Pendergrass et al. |

FOREIGN PATENT DOCUMENTS

| | | |
|---|---|---|
| EP | 0046528 A1 | 3/1982 |
| EP | 830554 A1 | 3/1998 |
| EP | 893657 A1 | 1/1999 |
| FR | 2687464 A1 | 8/1993 |
| GB | 1311232 A | 3/1973 |
| GB | 2006950 A | 5/1979 |
| JP | 60188795 A | 9/1985 |
| JP | 61164622 A | 7/1986 |
| JP | 62023418 A | 1/1987 |
| JP | 01041792 A | 2/1989 |
| JP | 6111591 A | 4/1994 |
| JP | 08135999 A | 5/1996 |
| JP | 09239230 A | 9/1997 |
| WO | WO-9112476 A1 | 8/1991 |
| WO | WO-9641111 A1 | 12/1996 |
| WO | WO-02-50623 A1 | 6/2002 |
| WO | WO-2008057647 A2 | 5/2008 |

OTHER PUBLICATIONS

"Air Conditioner/Dehumidifier," abstract from Spinoff 1986 article, facsimile dated Nov. 29, 1999, 2 pages.

"DrizAir 2400 Dehumidifier: Introduced in Aug. of 1998 . . . ", from web site, <http://www.dri-eaz.com/2400.htm>, Jan. 10, 2000, 2 pages.

Dri-Eaz, "Driz-Air 2400 Captures Design Award," <http://www.dri-eaz.com/newsreleases/newsrelease999.html>, internet accessed on Jan. 10, 2000, 2 pages.

Dri-Eaz, Product Catalog, Jan. 1, 2003, Burlington, Washington, U.S., 3 pages.

Dri-Eaz, "2002 Product Catalog," Jan. 1, 2002, 7 pages.

Dri-Eaz, "DrizAir 120 Dehumidifier—Model Comparisons," undated, 4 pages.

Dri-Eaz, "DrizAir 1200 Dehumidifier," 2000, 3 pages.

Dri-Eaz, "DrizAir 2400 Dehumidifier," undated, 4 pages.

Heat Pipe Technology, Inc., "Dinh Dehumidifier Heat Pipes, Commercial and Industrial Applications," undated, 8 pages.

Hodnell, Charles, "Wrap-Around Heat Pipe Makes Its Debut!" Hot Line Newsletter, vol. 15, No. 1, Mar. 1995, 2 pages Johannesen, R., et al., "Efficient Humidity Control with Heat Pipes," University of Florida—Florida Cooperative Extension Service, Fact Sheet, Dec. 1991, 7 pages.

Jon-Don; Gale Force Air Mover from Dry-Air at Jon-Don; www.jondon.com/galeforce/; Mar. 2003, 3 pages.

New Release, "Dri-EAZ Products Introduces Rotomolded Dehumidifier", Aug. 27, 1998, web site, <http://www.dri-eaz/newsreleases898.html>, 3 pages.

Tropic Kool, " What are Heat Pipes?" <http://tropickool.com/heat-pipes.html>, internet accessed on Nov. 29, 1999, 6 pages.

United Kingdom Search Report under Section 17 for United Kingdom Patent No. 0804707.8, Applicant: Dri-Eaz Products, Inc., search date May 20, 2008, 3 pages.

* cited by examiner

DEHUMIDIFICATION SYSTEMS AND METHODS FOR EXTRACTING MOISTURE FROM WATER DAMAGED STRUCTURES

RELATED APPLICATIONS

This application claims priority of U.S. Provisional Patent Application Ser. No. 60/918,003 filed Mar. 13, 2007, the contents of which are incorporated herein by reference.

TECHNICAL FIELD

The present invention relates to the extraction of moisture from air and, more specifically, to dehumidification systems adapted remove moisture from a water damaged structure.

BACKGROUND OF THE INVENTION

For a variety of reasons, it is desirable to control humidity, or the amount of water vapor in air, within a structure. For example, heating, ventilating, and air conditioning (HVAC) systems are often used to control the climate of air within a structure. HVAC systems are typically built into the structure and are designed to provide, within certain predetermined parameters, thermal comfort and acceptable indoor air quality for occupants of the structure. The control of humidity can be an important component of a properly functioning HVAC system. Should the HVAC system of a building fail, the need may exist for environmental control systems that can be used to provide thermal comfort and acceptable indoor air quality on a temporary basis.

Additionally, a structure is subjected to fluid damage from internal or external sources. The term "water damage" as used herein refers to any flowable material a major portion of which is water. To limit or prevent permanent damage to the structure or the contents thereof from moisture, moisture within the structure should be removed as quickly as possible. Air movers improve air flow over damp surfaces to promote drying, and dehumidifiers extract moisture from air to enhance the drying capacity of air flowing over damp surfaces.

Air movers and dehumidifiers can be relatively small, wheeled devices that can be arranged within the structure from which moisture is to be removed. Air movers and/or dehumidifiers adapted to operate within a structure will be referred to as interior drying systems. Alternatively, larger air movers and dehumidifiers can be mounted on trucks or trailers and connected by air conduits to the structure. Truck or trailer mounted air movers and/or dehumidifiers will be referred to herein as exterior drying systems.

The present invention is of particular significance in the context of exterior drying systems, and that application of the present invention will be described herein in detail. Exterior drying systems can be used both as a backup HVAC system and to limit or prevent water damage.

The need exists for improved drying systems that are energy efficient and optimize drying rates.

SUMMARY OF THE INVENTION

The present invention may be embodied as a dehumidification system for removing moisture from the air within a structure comprises a refrigerant system and a heat transfer system. The refrigerant system comprises a condenser section and an evaporator section. The heat transfer system comprises a first coil and a second coil. A primary air path extends through the first coil, the evaporator section, and the second coil. A secondary air path extends through the condenser section.

The present invention may also be embodied as a method of removing moisture from the air within a structure, comprising the following steps. A refrigerant system comprising a condenser section and an evaporator section is provided. A heat transfer system comprising a first coil and a second coil is provided. A primary air path is formed to extend through the first coil, the evaporator section, and the second coil. A secondary air path is formed to extend through the condenser section.

The present invention may also be embodied as a dehumidification system for removing moisture from the air within a structure. The dehumidification system comprising a refrigerant system and a heat transfer system. The refrigerant system comprises a condenser section and an evaporator section. Refrigerant fluid is circulated between the condenser section and the evaporator section. The heat transfer system comprises a first coil, a second coil, and a pump. When the pump is on, heat transfer fluid is circulated between the first and second coils. When the pump is off, heat transfer fluid is not circulated between the first and second coils. A primary air path defines a primary inlet and a primary outlet. The primary air path extends through the first coil, the evaporator section, and the second coil. Air is displaced along the primary path from the primary inlet to the primary outlet. A secondary air path defines a secondary inlet and a secondary outlet. The secondary air path extends through the condenser section, and air is displaced along the secondary path from the secondary inlet to the secondary outlet. The primary inlet and the primary outlet are connected to the structure.

DETAILED DESCRIPTION OF THE INVENTION

Figure 1:
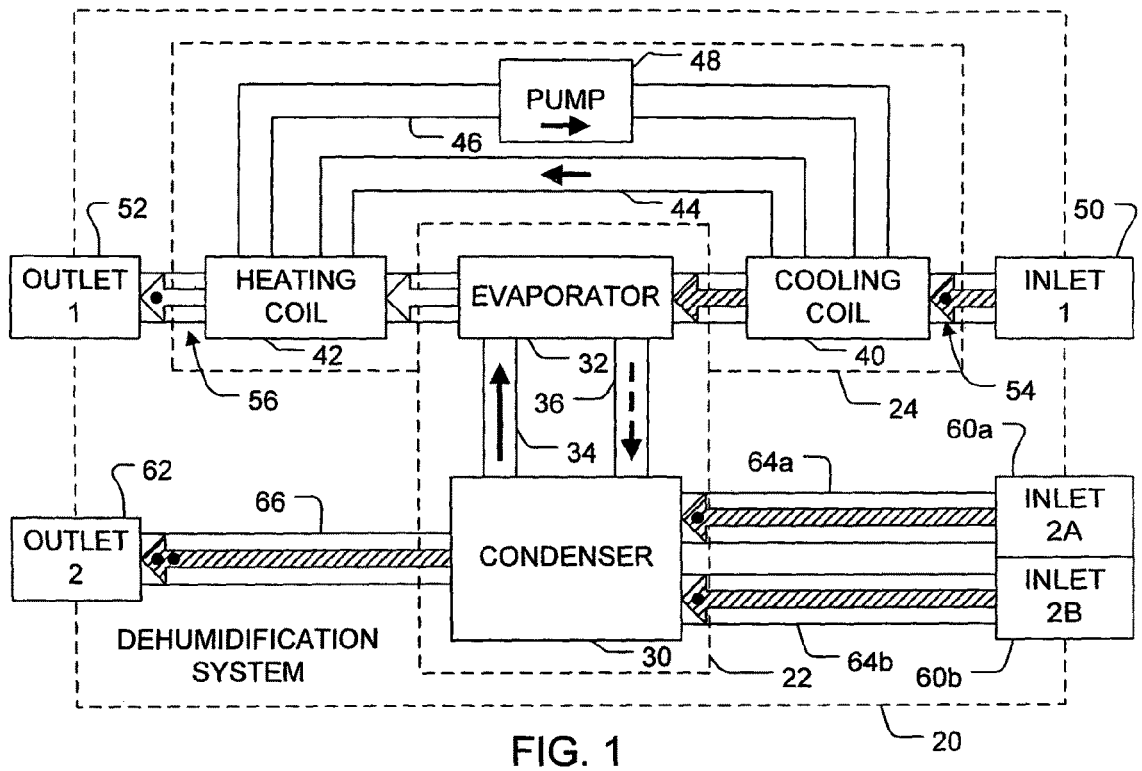
FIG. 1 is a schematic view of an example dehumidification system of the present invention.

Referring initially to FIG. 1 of the drawing, depicted therein is an example dehumidification system 20 constructed in accordance with, and embodying, the principles of the present invention. The example dehumidification system 20 comprises a refrigerant system 22 and a heat transfer system 24.

The refrigerant system 22 extracts moisture from a primary flow of process air flowing therethrough. In certain operating configurations of the dehumidification system 20, the heat transfer system 24 cools the primary flow of working air flowing into the refrigerant system 22 and then warms the primary flow of working air flowing out of the refrigerant system 22. When used, the heat transfer system 24 can optimize the extraction of moisture from the primary flow of working air.

The refrigerant system 22 comprises a condenser section 30 and an evaporator section 32. The condenser section 30 is connected to the evaporator section 32 by a first refrigerant conduit 34 that carries refrigerant liquid from the condenser section 30 to the evaporator section 32 and by a second refrigerant conduit 36 that carries refrigerant vapor from the evaporator section 32 to the condenser section 30. The construction and operation of the refrigerant system 22 is or may be conventional and will not be described herein beyond what is necessary for a complete understanding of the present invention.

The heat transfer system 24 comprises a cooling coil 40 and a heating coil 42. The cooling coil 40 is connected to the heating coil 42 by a first heat transfer conduit 44 that carries heat transfer fluid from the cooling coil 40 to the heating coil 42 and a second heat transfer conduit 46 that carries heat transfer fluid from the heating coil 42 to the cooling coil 40. A circulating pump 48 causes heat transfer fluid to flow in a loop between the cooling coil 40 and the heating coil 42. The construction and operation of the heat transfer also is or may be conventional and will not be described herein beyond what is necessary for a complete understanding of the present invention.

The example dehumidification system 20 defines an evaporator inlet 50 and an evaporator outlet 52. An evaporator inlet conduit 54 extends between the evaporator inlet 50 and the evaporator section 32. An evaporator outlet conduit 56 extends between the evaporator section 32 and the evaporator outlet 52. More than one evaporator inlet conduit and corresponding evaporator inlet conduit may be used.

The cooling coil 40 is arranged in the evaporator inlet conduit 54, while the heating coil 42 is arranged in the evaporator outlet conduit 56. Fluid flowing from the evaporator inlet 50 to the evaporator outlet 52 thus flows along a primary fluid path through and/or around the cooling coil 40, through and/or around the evaporator section 32, and then through and/or around the heating coil 42. Fluid flowing along the primary fluid path may be referred to herein as primary fluid.

The example dehumidification system 20 further defines a pair of condenser inlets 60a and 60b and a condenser outlet 62. A pair of condenser inlet conduits 64a and 64b extend between the condenser inlets 60a and 60b, respectively, and the condenser section 30. A condenser outlet conduit 66 extends between the condenser section 30 and the condenser outlet 62.

Two condenser inlets 60a and 60b and two condenser inlet conduits 64a and 64b are depicted in FIG. 1 because the example dehumidification system 20 is designed to accommodate a desired air flow rate using conventionally sized components. In the context of the physical layout of the components of the dehumidification system 20, the use of two condenser inlets and condenser inlet conduits also creates a more desirable flow of fluid across the condenser section 30. However, the present invention may be embodied in a dehumidification system using only one condenser inlet and corresponding condenser inlet conduit or more than two condenser inlets and corresponding condenser inlet conduits.

Fluid flowing from either of the condenser inlets 60 to the condenser outlet 62 thus flows along a secondary fluid path through and/or around the condenser section 30. Fluid flowing along the secondary fluid path will be referred to herein as secondary fluid.

The example dehumidification system 20 is thus capable of processing two air flows: the primary fluid flowing along the primary fluid path, and the secondary fluid flowing along the secondary fluid path. In each of the operating configurations in which the dehumidification system 20 is conventionally used, the dehumidification system 20 will process one or both of these air flows.

The flow of fluid in FIGS. 1-5 is represented by arrows. A solid arrow indicates liquid flow, and a broken arrow indicates vapor flow. An open arrow indicates air flow. The direction of air flow arrows indicates the direction of the flow of air. Right-angled cross-hatching within air flow arrows corresponds to relatively moist air, while a lack of cross-hatching within air flow arrows corresponds to relatively dry air. Left cross-hatching within air flow arrows represents ambient air. A single dot within air flow arrows indicates air temperature within an intermediate temperature range. A double dot within flow arrows indicates air temperature within an upper temperature range above the intermediate temperature range. No dot within a flow arrow indicates air temperature within a lower temperature range below the intermediate temperature range.

Referring again specifically to FIG. 1, that figure illustrates the operation of the system 20 in a first operating configuration as will be described in further detail below. In this configuration, warm moist air enters the dehumidification system 20 through the evaporator inlet 50 and through the condenser inlets 60a and 60b. The warm moist air entering the system 20 is represented by a right cross-hatched arrow containing a single dot.

Warm moist air entering the evaporator inlet 50 is initially cooled by the cooling coil 40 to obtain cool moist air, as represented by a right cross-hatched arrow containing no dot. The cool moist air from the cooling coil 40 is passed through the evaporator section 32, which removes moisture from the air flow; the air flow is thus represented by an air flow arrow without cross-hatching and no dot. The cool dry air from the evaporator section 32 is passed through the heating coil 42, which adds heat previously extracted by the cooling coil 40 back into the air flow. The air flow exiting the heating coil 42 thus contains warm, dry air and is represented by an air flow arrow without cross-hatching and with a single dot.

The extraction of heat by the cooling coil 40 increases the efficiency with which the evaporator section 32 removes moisture from the air. However, the heating coil 42 recycles the heat extracted by the cooling coil 40 to increase the efficiency of the overall dehumidification system 20 under certain operating configurations as will be described in further detail below.

In this first operating configuration, warm moist air entering the condenser inlets 60a and 60b is represented by a right cross-hatched arrow containing a single dot. This air flow passes through and/or around the condenser 30 to obtain hot moist air. The hot moist air exiting the condenser 30 is represented by a right cross-hatched arrow containing two dots.

With the foregoing general understanding of the operation of the dehumidification system 20 in mind, several examples of operating configurations in which the example dehumidification system 20 may be used will now be discussed with reference to FIGS. 2-5.

In each of the operating configurations discussed below, the dehumidification system 20 is used as part of a restorative drying system for removing moisture from a water damaged structure. The term "water damaged structure" will be used herein to refer to any structure containing moisture where moisture is not supposed to be. In this context, the damage to the structure caused by the water may be permanent or temporary.

Additionally, the dehumidification system 20 will be used in the context of environmental factors such as ambient temperature outside of the water damaged structure, relative humidity outside the water damaged structure, air temperature within the water damaged structure, and relative humidity within the water damaged structure. The dehumidification system 20 will be placed in one or more of the operating configurations as described herein based on these environmental factors.

Figure 2:
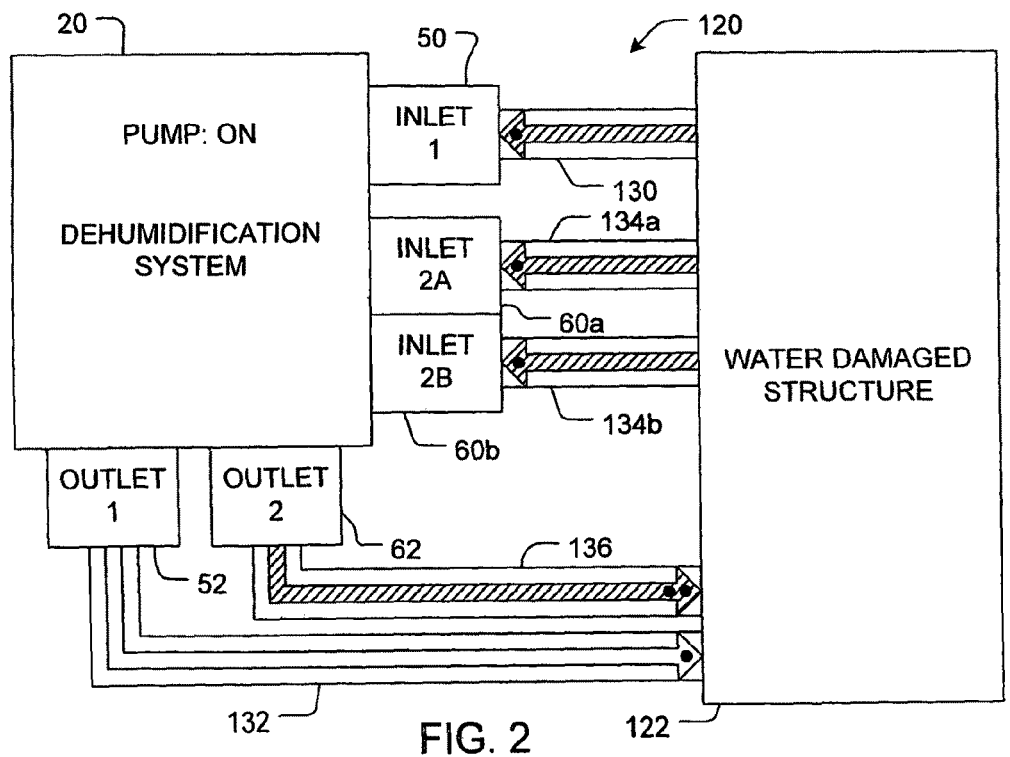
FIG. 2 is a schematic view of the dehumidification system of FIG. 1 connected in a first configuration to a water damaged structure.

In the first operating configuration depicted in FIGS. 1 and 2, the dehumidification system 20 is used as part of a first example restorative drying system 120 to remove moisture from a water damaged structure 122. The first operating configuration depicted in FIG. 2 may be referred to as a cold weather configuration.

The restorative drying system 120 comprise, in addition to the dehumidification system 20, an evaporator inlet pipe 130, an evaporator outlet pipe 132, a pair of condenser inlet pipes 134a and 134b, and a condenser outlet pipe 136. In this first configuration, the evaporator inlet pipe 130 is connected between the structure 122 and the evaporator inlet 50. The evaporator outlet pipe 132 is connected between the structure 122 and the evaporator outlet 52. The pair of condenser inlet pipes 134a and 134b are connected between the structure 122 and the condenser inlets 60a and 60b. The condenser outlet pipe 136 is connected between the structure 122 and the condenser outlet 62.

When the dehumidification system 20 is configured in the first operating configuration as part of the restorative drying system 120, the refrigerant system 22 is operated normally such that the refrigerant fluid is circulated between the condenser section 30 and the evaporator section 32. In this first operating configuration, the pump 48 is placed in the "ON" condition such that heat transfer fluid is circulated between the cooling coil 40 and the heating coil 42 to operate the heat transfer system 24.

Because it is water damaged, the structure 122 contains moisture; the air within the structure 122 is thus relatively moist, and as will be described in further detail below, the air within the structure 122 has been heated. The flow of air out of the structure 122 into the dehumidification system 20 is thus represented by a right cross-hatched arrow containing a single dot.

The warm moist air from the structure 122 is forced into the evaporator inlet 50 through the evaporator inlet pipe 130 and the condenser inlets 60a and 60b through the condenser inlet pipes 134a and 134b. Typically, the restorative drying system 120 further comprises air movers (not shown) that force the warm, moist air from the structure 122 through the pipes 130, 134a, and 134b. The use of air movers in this manner is conventional and will not be described in detail herein.

As described above with reference to FIG. 1, the warm moist air entering the evaporator inlet 50 is converted into warm dry air that exits the evaporator outlet 52. The warm dry air exiting the evaporator outlet 52 is carried back into the water damaged structure 122 by the evaporator outlet pipe 132. Similarly, warm moist air entering the condenser inlets 60a and 60b is converted into hot moist air that exits the condenser outlet 62. The hot moist air exiting the condenser outlet 62 is carried back into the water damaged structure 122 by the condenser outlet pipe 136.

With the first example restorative drying system 120, the condenser section 30 heats the air within the water damaged structure 122 to increase the rate at which moisture may be extracted from the structure 122. Further, the efficiency of the evaporator section 32 is increased by pre-cooling the warm moist air extracted from the structure 122. And because the heat is returned to the dry air after the evaporator section 32, the overall restorative drying system 120 is more efficient in that the majority of the heat extracted from the system 120 by the cooling coil 40 is reintroduced into the system 120 by the heating coil 42.

Figure 3:
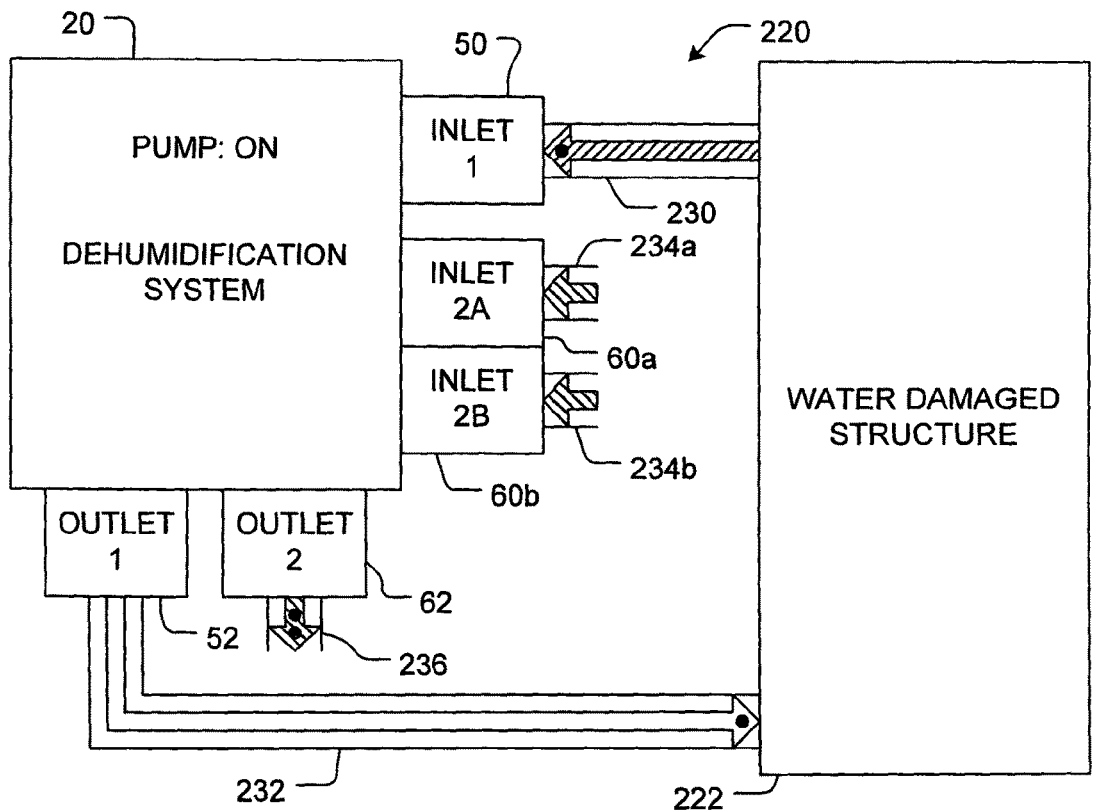
FIG. 3 is a schematic view of the dehumidification system of FIG. 1 connected in a second configuration to a water damaged structure.

Turning now to FIG. 3 of the drawing, a second operating configuration of the dehumidification system 20 will now be described with reference to a second example restorative drying system 220. The second example restorative drying system 220 to remove moisture from a water damaged structure 222. The second operating configuration depicted in FIG. 3 may be referred to as a tropical weather configuration.

The restorative drying system 220 comprise, in addition to the dehumidification system 20, an evaporator inlet pipe 230, an evaporator outlet pipe 232, a pair of condenser inlet pipes 234a and 234b, and a condenser outlet pipe 236. In this second operating configuration, the evaporator inlet pipe 230 is connected between the structure 222 and the evaporator inlet 50.

However, unlike in the first operating configuration, the evaporator outlet pipe 232 is not connected between the structure 222 and the evaporator outlet 52 and the condenser inlet pipes 234a and 234b are not connected between the structure 222 and the condenser inlets 60a and 60b. Instead, the condenser outlet pipe 232 and the condenser inlet pipes 234a and 234b are open to ambient air outside of the structure 222. Ambient air thus enters these pipes 234a and 234b as shown by left cross-hatched arrows, and heated ambient air exits the condenser outlet pipe 236 as shown by the two dots in the left cross-hatched air flow arrow.

When the dehumidification system 20 is configured in the second configuration as part of the restorative drying system 220, the refrigerant system 22 is operated normally such that the refrigerant fluid is circulated between the condenser section 30 and the evaporator section 32. In this second configuration, the pump 48 is placed in the "ON" condition such that heat transfer fluid is circulated between the cooling coil 40 and the heating coil 42 to operate the heat transfer system 24.

Because it is water damaged, the structure 222 contains moisture; the air within the structure 222 is thus relatively moist, and as will be described in further detail below, the air within the structure 222 has been heated. Again, the flow of air out of the structure 222 into the dehumidification system 20 is represented by a right cross-hatched arrow containing a single dot.

The warm moist air from the structure 222 is forced into the evaporator inlet 50 through the evaporator inlet pipe 230. Typically, the restorative drying system 220 further comprises air movers (not shown) that force the warm, moist air from the structure 222 through the pipe 230. The use of air movers in this manner is conventional and will not be described in detail herein.

As described above with reference to FIG. 1, the warm moist air entering the evaporator inlet 50 is converted into warm dry air that exits the evaporator outlet 52. The warm dry air exiting the evaporator outlet 52 is carried back into the water damaged structure 222 by the evaporator outlet pipe 232. Ambient air entering the condenser inlets 60a and 60b is simply used to operate the refrigerant system 22 and is simply vented back to ambient air.

Figure 4:
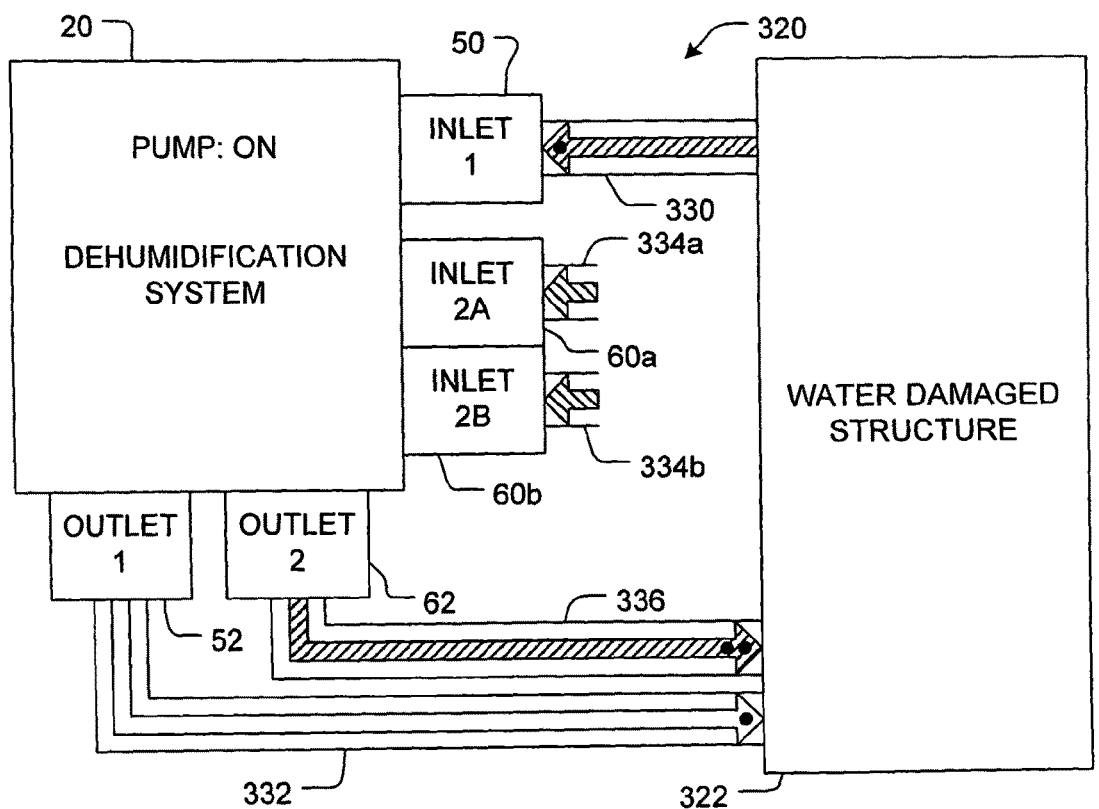
FIG. 4 is a schematic view of the dehumidification system of FIG. 1 connected in a third configuration to a water damaged structure.

Turning now to FIG. 4 of the drawing, a third operating configuration of the dehumidification system 20 will now be described with reference to a second example restorative drying system 320. The second example restorative drying system 320 to remove moisture from a water damaged structure 322. The third operating configuration depicted in FIG. 4 may be referred to as a cool/dry weather configuration.

The restorative drying system 320 comprise, in addition to the dehumidification system 20, an evaporator inlet pipe 330, an evaporator outlet pipe 332, a pair of condenser inlet pipes 334a and 334b, and a condenser outlet pipe 336. In this second configuration, the evaporator inlet pipe 330 is connected between the structure 322 and the evaporator inlet 50. The evaporator outlet pipe 332 is connected between the structure 322 and the evaporator outlet 52. The condenser outlet pipe 336 is connected between the structure 322 and the condenser outlet 62.

However, unlike in the first operating configuration, the condenser inlet pipes 334a and 334b are not connected between the structure 322 and the condenser inlets 60a and 60b. Instead, the condenser inlet pipes 334a and 334b are open to ambient air outside of the structure 322. Ambient air thus enters these pipes 334a and 334b as shown by left cross-hatched arrows.

When the dehumidification system 20 is configured in the second configuration as part of the restorative drying system 320, the refrigerant system 22 is operated normally such that the refrigerant fluid is circulated between the condenser section 30 and the evaporator section 32. In this second configuration, the pump 48 is placed in the "ON" condition such that heat transfer fluid is circulated between the cooling coil 40 and the heating coil 42 to operate the heat transfer system 24.

Because it is water damaged, the structure 322 contains moisture; the air within the structure 322 is thus relatively moist, and as will be described in further detail below, the air within the structure 322 has been heated. Again, the flow of air out of the structure 322 into the dehumidification system 20 is represented by a right cross-hatched arrow containing a single dot.

The warm moist air from the structure 322 is forced into the evaporator inlet 50 through the evaporator inlet pipe 330, and ambient air is introduced into the condenser inlets 60a and 60b through the condenser inlet pipes 334a and 334b. Typically, the restorative drying system 320 further comprises air movers (not shown) that force the warm, moist air from the structure 322 through the pipes 330, 334a, and 334b. The use of air movers in this manner is conventional and will not be described in detail herein.

As described above with reference to FIG. 1, the warm moist air entering the evaporator inlet 50 is converted into warm dry air that exits the evaporator outlet 52. The warm dry air exiting the evaporator outlet 52 is carried back into the water damaged structure 322 by the evaporator outlet pipe 332. Ambient air entering the condenser inlets 60a and 60b is used to operate the refrigerant system 22 and reintroduced into the structure 322 by the condenser outlet pipe 336.

Figure 5:
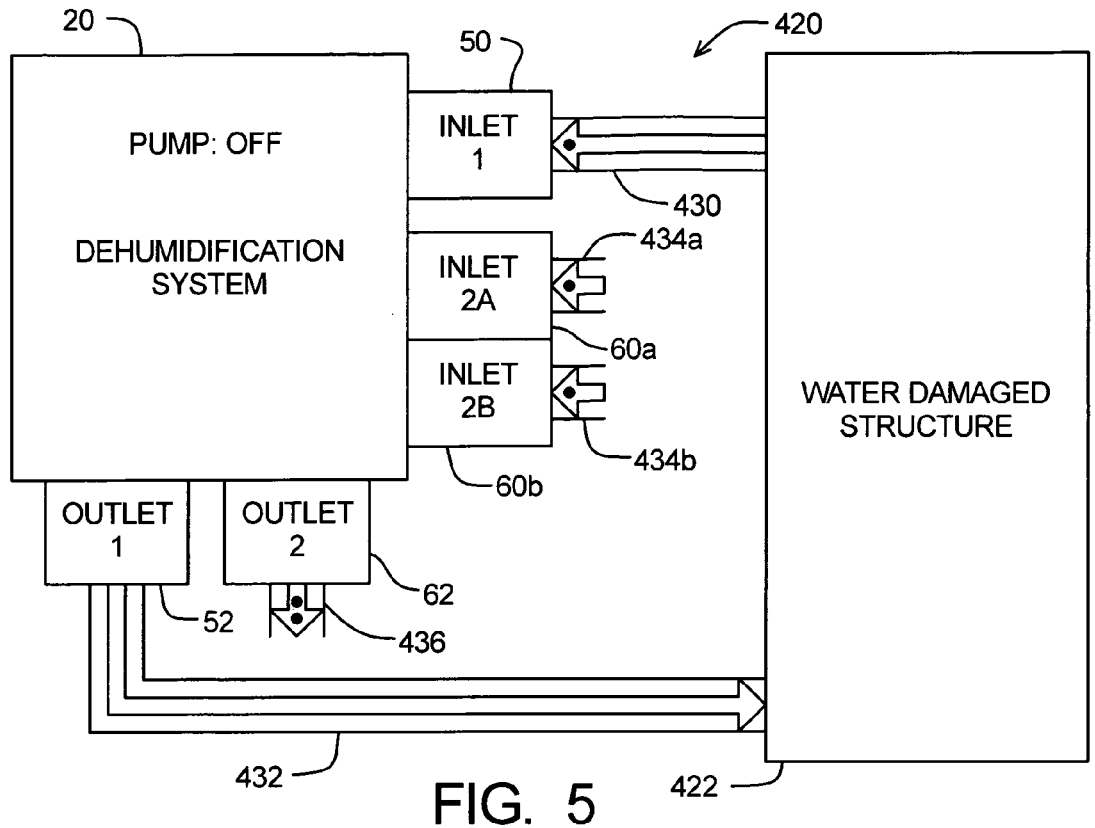
FIG. 5 is a schematic view of the dehumidification system of FIG. 1 connected in a fourth configuration to a water damaged structure.

Turning now to FIG. 5 of the drawing, a fourth operating configuration of the dehumidification system 20 will now be described with reference to a fourth example restorative drying system 420. The fourth example restorative drying system 420 to remove moisture from a water damaged structure 422. The fourth operating configuration depicted in FIG. 5 may be referred to as a cooling (A/C) configuration.

The restorative drying system 420 comprise, in addition to the dehumidification system 20, an evaporator inlet pipe 430, an evaporator outlet pipe 432, a pair of condenser inlet pipes 434a and 434b, and a condenser outlet pipe 436. In this fourth operating configuration, the evaporator inlet pipe 430 is connected between the structure 422 and the evaporator inlet 50.

However, unlike in the first operating configuration, the condenser outlet pipe 436 is not connected between the structure 422 and the condenser outlet 62 and the condenser inlet pipes 434a and 434b are not connected between the structure 422 and the condenser inlets 60a and 60b. Instead, the condenser outlet pipe 436 and the condenser inlet pipes 434a and 434b are open to ambient air outside of the structure 422. Ambient air thus enters these pipes 434a and 434b as shown by left cross-hatched arrows, and heated ambient air exits the condenser outlet pipe 436 as shown by the two dots in the left cross-hatched air flow arrow.

When the dehumidification system 20 is configured in the fourth configuration as part of the restorative drying system 420, the refrigerant system 22 is operated normally such that the refrigerant fluid is circulated between the condenser section 30 and the evaporator section 32. However, in this fourth configuration, the pump 48 is placed in the "OFF" condition such that heat transfer fluid does not circulate between the cooling coil 40 and the heating coil 42.

Because it is water damaged, the structure 422 contains moisture; the air within the structure 422 is thus relatively moist, and as will be described in further detail below, the air within the structure 422 has been heated. Again, the flow of air out of the structure 422 into the dehumidification system 20 is represented by a right cross-hatched arrow containing a single dot.

The warm moist air from the structure 422 is forced into the evaporator inlet 50 through the evaporator inlet pipe 430. Typically, the restorative drying system 420 further comprises air movers (not shown) that force the warm, moist air from the structure 422 through the pipe 430. The use of air movers in this manner is conventional and will not be described in detail herein.

The moist air entering the evaporator inlet 50 is converted into dry air that exits the evaporator outlet 52. The dry air exiting the evaporator outlet 52 is carried back into the water damaged structure 422 by the evaporator outlet pipe 432. Ambient air entering the condenser inlets 60a and 60b is simply used to operate the refrigerant system 22 and is simply vented back to ambient air.

Figure 6:
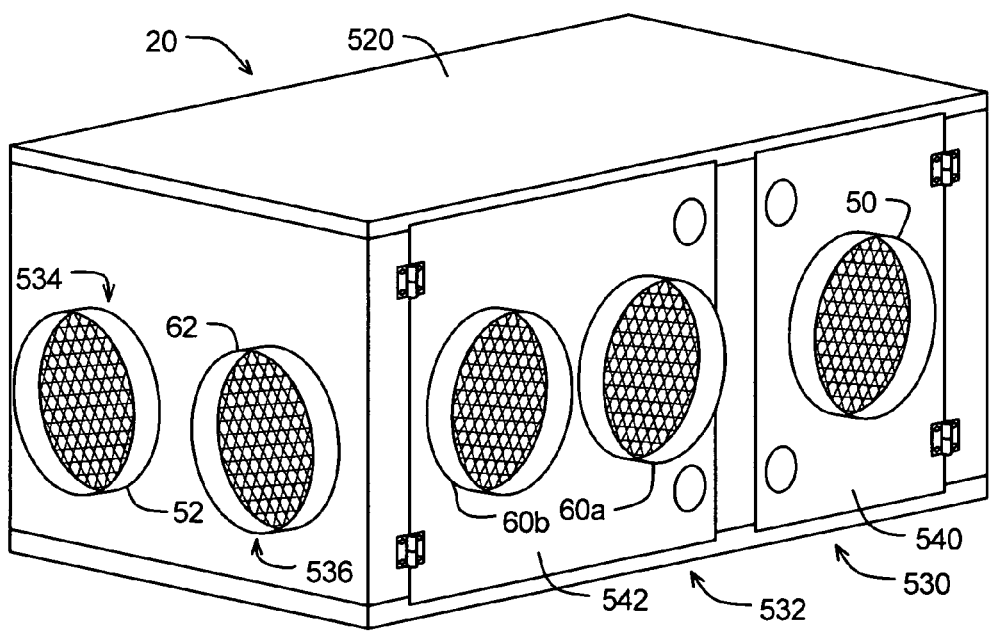
FIG. 6 is a perspective view of an example dehumidification system as depicted in FIG. 1.

The dehumidification system 20 described herein is typically mounted on a trailer for easy transportation to water damaged structures. FIG. 6 illustrates one example of a dehumidification system 20 embodying the principles of the present invention. The dehumidification system 20 comprises a housing 520, defining first, second, third, and fourth openings 530, 532, 534, and 536. The first and second openings 530 and 532 are covered by first and second doors 540 and 542, respectively. The first door 540 defines the evaporator inlet 50, while the second door 542 defines the condenser inlets 60a and 60b. The evaporator outlet 52 is formed at the third opening 534, while the condenser outlet 62 is formed at the fourth opening 534.

What is claimed is:

1. A dehumidification system for removing moisture from the air within a structure, comprising:
  a refrigerant system comprising a condenser section and an evaporator section;
  a heat transfer system comprising a first coil and a second coil;
  a primary air path extending through the first coil, the evaporator section, and the second coil; and
  a secondary air path extending through the condenser section, wherein:
    an inlet and an outlet of the secondary air path are connected to the structure; and
    a pump circulates heat transfer fluid between the first coil and the second coil.

2. A dehumidification system for removing moisture from the air within a structure, comprising:
  a refrigerant system comprising a condenser section and an evaporator section;

a heat transfer system comprising a first coil and a second coil;
a primary air path extending through the first coil, the evaporator section, and the second coil; and
a secondary air path extending through the condenser section, wherein:
an inlet and an outlet of the secondary air path are connected to ambient air; and
a pump circulates heat transfer fluid between the first coil and the second coil.

3. A dehumidification system for removing moisture from the air within a structure, comprising:
a refrigerant system comprising a condenser section and an evaporator section;
a heat transfer system comprising a first coil and a second coil;
a primary air path extending through the first coil, the evaporator section, and the second coil; and
a secondary air path extending through the condenser section, wherein:
an inlet of the secondary path is connected to ambient air;
an outlet of the secondary path is connected to the structure; and
a pump circulates heat transfer fluid between the first coil and the second coil.

4. A dehumidification system for removing moisture from the air within a structure, comprising:
a refrigerant system comprising a condenser section and an evaporator section;
a heat transfer system comprising a first coil and a second coil;
a primary air path extending through the first coil, the evaporator section, and the second coil; and
a secondary air path extending through the condenser section, wherein:
an inlet of the secondary path is connected to ambient air; and
an outlet of the secondary path is connected to the structure.

5. A dehumidification system for removing moisture from the air within a structure, comprising:
a refrigerant system comprising a condenser section and an evaporator section;
a heat transfer system comprising a first coil and a second coil;
a primary air path extending through the first coil, the evaporator section, and the second coil; and
a secondary air path extending through the condenser section, wherein the dehumidification system operates in:
a first configuration in which an inlet and an outlet of the secondary air path are connected to the structure and a pump circulates heat transfer fluid between the first coil and the second coil;
a second configuration in which an inlet and an outlet of the secondary air path are connected to ambient air and a pump circulates heat transfer fluid between the first coil and the second coil;
a third configuration in which an inlet of the secondary air path is connected to ambient air, an outlet of the secondary air path is connected to the structure, and a pump circulates heat transfer fluid between the first coil and the second coil; and
a fourth configuration in which an inlet of the secondary air path is connected to ambient air and an outlet of the secondary air path is connected to the structure.

6. A method of removing moisture from the air within a structure, comprising:
providing a refrigerant system comprising a condenser section and an evaporator section;
providing a heat transfer system comprising a first coil and a second coil;
forming a primary air path extending through the first coil, the evaporator section, and the second coil; and
forming a secondary air path extending through the condenser section.

7. A method as recited in claim 6, further comprising the steps of:
connecting an inlet and an outlet of the secondary path to the structure; and
circulating heat transfer fluid between the first coil and the second coil.

8. A method as recited in claim 6, further comprising the steps of:
connecting an inlet and an outlet of the secondary path to ambient air; and
circulating heat transfer fluid between the first coil and the second coil.

9. A method as recited in claim 6, further comprising the steps of:
connecting an inlet of the secondary air path to ambient air;
connecting an inlet of the secondary air path to the structure; and
circulating heat transfer fluid between the first coil and the second coil.

10. A method as recited in claim 6, further comprising the step of:
connecting an inlet of the secondary air path to ambient air; and
connecting an inlet of the secondary air path to the structure.

11. A method as recited in claim 6, further comprising the steps of forming:
a first configuration by
connecting an inlet and an outlet of the secondary path to the structure, and
circulating heat transfer fluid between the first coil and the second coil;
a second configuration by
connecting an inlet and an outlet of the secondary path to ambient air, and
circulating heat transfer fluid between the first coil and the second coil;
a third configuration by
connecting an inlet of the secondary air path to ambient air,
connecting an inlet of the secondary air path to the structure, and
circulating heat transfer fluid between the first coil and the second coil; and
a fourth configuration by
connecting an inlet of the secondary air path to ambient air; and
connecting an inlet of the secondary air path to the structure.

12. A dehumidification system for removing moisture from the air within a structure, comprising:
a refrigerant system comprising a condenser section and an evaporator section,
where refrigerant fluid is circulated between the condenser section and the evaporator section;
a heat transfer system comprising a first coil, a second coil, and a pump, where when the pump is on, heat transfer fluid is circulated between the first and second coils, and when the pump is off, heat transfer fluid is not circulated between the first and second coils;

a primary air path defining a primary inlet and a primary outlet, where the primary air path extends through the first coil, the evaporator section, and the second coil, and air is displaced along the primary path from the primary inlet to the primary outlet; and a secondary air path defining a secondary inlet and a secondary outlet, where the secondary air path extends through the condenser section, and air is displaced along the secondary path from the secondary inlet to the secondary outlet; whereby the primary inlet and the primary outlet are connected to the structure.

13. A dehumidification system as recited in claim 12, where the dehumidification system operates in a first configuration in which:

the secondary inlet and the secondary outlet are connected to the structure; and the pump is on.

14. A dehumidification system as recited in claim 12, where the dehumidification system operates in a second configuration in which:

the secondary inlet and the secondary outlet are connected to ambient air; and the pump is on.

15. A dehumidification system as recited in claim 12, where the dehumidification system operates in a third configuration in which:

the secondary inlet is connected to ambient air;

the secondary outlet is connected to the structure; and the pump is on.

16. A dehumidification system as recited in claim 12, where the dehumidification system operates in a fourth configuration in which:

the secondary inlet is connected to ambient air;

the secondary outlet is connected to the structure; and the pump is off.

17. A dehumidification system as recited in claim 12, where the dehumidification system operates in:

a first configuration in which the secondary inlet and the secondary outlet are connected to the structure, and the pump is on; and a second configuration in which the secondary inlet and the secondary outlet are connected to ambient air, and the pump is on;

a third configuration in which the secondary inlet is connected to ambient air, the secondary outlet is connected to the structure, and the pump is on;

a fourth configuration in which the secondary inlet is connected to ambient air, the secondary outlet is connected to the structure, and the pump is off.

* * * * *